United States Patent [19]

Auvoja

[11] Patent Number: 5,040,564
[45] Date of Patent: Aug. 20, 1991

[54] SYSTEM FOR EXCHANGING CONTAINERS WHILE IN OPERATION

[75] Inventor: Anders Auvoja, Hässleholm, Sweden

[73] Assignee: Dinol Aktiebolag, Hassleholm, Sweden

[21] Appl. No.: 479,995

[22] Filed: Feb. 14, 1990

[30] Foreign Application Priority Data

Mar. 20, 1989 [SE] Sweden .............................. 8900976

[51] Int. Cl.⁵ ............................................. F16K 11/10
[52] U.S. Cl. ..................................... 137/558; 137/113; 137/563
[58] Field of Search ............... 137/113, 563, 558, 606; 73/290 V, 304 C

[56] References Cited

U.S. PATENT DOCUMENTS

| | | | |
|---|---|---|---|
| 2,742,048 | 4/1956 | Kromer | 137/563 X |
| 3,572,366 | 3/1971 | Wiggins | 137/563 X |
| 4,066,097 | 1/1978 | Fritsch | 137/563 |
| 4,247,018 | 1/1981 | Credle | 137/113 X |
| 4,390,126 | 1/1983 | Buchholz et al. | 137/563 X |
| 4,535,917 | 8/1985 | Trewhella | 137/563 X |
| 4,676,101 | 6/1987 | Baughman | 73/304 C |
| 4,683,864 | 8/1987 | Bucci | 137/113 X |
| 4,839,590 | 6/1989 | Koski et al. | 73/290 V X |

Primary Examiner—Stephen M. Hepperle
Attorney, Agent, or Firm—Burns, Doane, Swecker & Mathis

[57] ABSTRACT

A system for exchanging containers containing a medium while the system is in operation without admitting air includes at least two intermediate containers, each of which is connected to a respective transport container. Each of the at least two intermediate containers is also connected to their respective transport container by way of a return tube and a pump. Each of the at least two intermediate containers is also connected to a common outlet tube by way of an interconnecting outlet tube. The common outlet tube is connected to a spraying station and each of the at least two intermediate containers includes a device for determining the level of medium in the respective intermediate container.

8 Claims, 1 Drawing Sheet

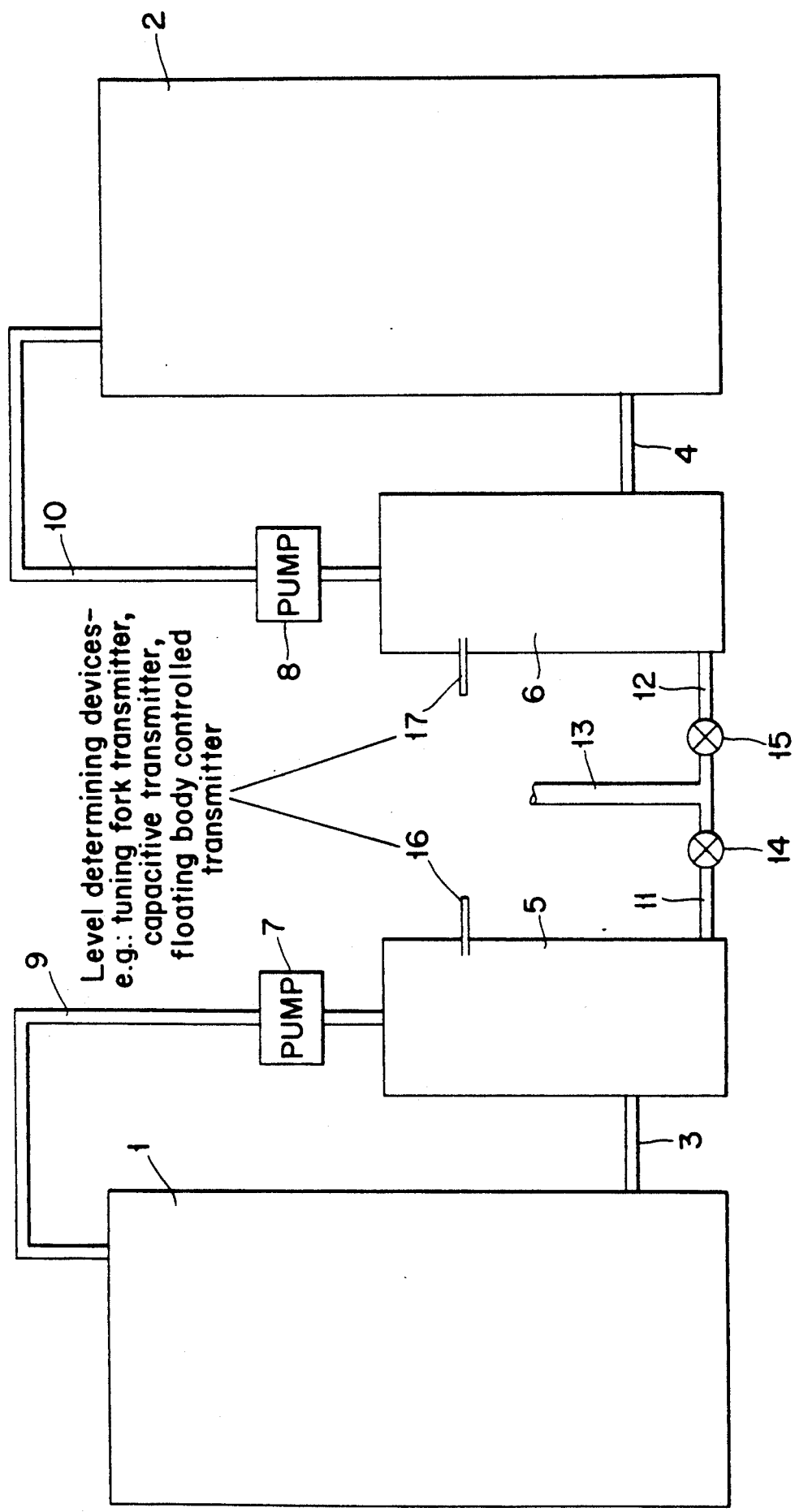

SYSTEM FOR EXCHANGING CONTAINERS WHILE IN OPERATION

TECHNICAL FIELD

The present invention relates to a system for exchanging containers containing a medium, while said containers are in operation without access of air, and during the spraying of said medium.

The object of the present invention is to obtain a possibility of shifting from one container containing a medium, to another container containing the same medium without the admission of air, when one of the containers has become substantially empty.

BACKGROUND OF THE INVENTION

At the spraying of different media, such as spraying of a rust protecting agent into a car body, or onto the underside of a car chassis, it is essential that air does not enter the spraying system, as spotting of the product then will occur, which will seriously affect the spraying picture and thereby the spraying result, and further, a correct measurement of the flow can not take place. The measuring of the flow is inter alia essential in order to be able to determine that the correct amount of rust protecting agent has been applied. Problems with the admission of air appears then each time one has to exchange the transport/storage container, and as it has to take place rather frequently for the reason of limited space and other reasons, this problem arises with a quite disturbing frequency.

Demand for a solution of this problem to exchange a transport container while in operation has thus been raised.

SUMMARY OF THE PRESENT INVENTION

It has now surprisingly been shown possible to be able to solve this problem by means of the present invention which is characterized in that it comprises at least two intermediate containers, each being arranged to be connected to a transport (storage) container for said medium, to receive from said transport container a feed of medium, and each being arranged to be reconnected to said transport container using a return tube via a pump, and whereby each intermediate container is arranged via a tube and a valve to a tube leading up to a spraying station, each said intermediate container further comprising a device for determining the level of medium in the same.

By means of the present invention it is obtained that, when a medium is running dry from a transport container, air will enter an intermediate container, the level sensing device determines a level of the medium and controls the valve arranged in said outgoing tube to be closed, simultaneously as it controls the starting of feeding medium from a second transport container to its intermediate container by means of the pump arranged in the return tube and controls the opening of the valve arranged in the outgoing tube of said second intermediate container without allowing air to pass into said outgoing tube and into the tube of the spraying station.

BRIEF DESCRIPTION OF THE DRAWING FIGURE

The invention will be described more in detail in the following with reference to the attached drawing, the single figure of which is a schematic illustration of a preferred embodiment of the invention however, without being restricted thereto.

DETAILED DESCRIPTION OF THE PREFERRED EMBODIMENT 1 and 2 denote a first and a second transport container for a medium. To said transport containers 1 and 2 feeding tubes 3 and 4 are arranged leading to two intermediate containers 5 and 6, whereby these feeding tubes 3 and 4 are connected to the intermediate containers 5 and 6 at some distance from their bottoms. At the top of each intermediate container 5 and 6 a pump 7 and 8 is arranged in combination with a return tube 9 and 10 to the respective transport container 1 and 2. In the bottom, or substantially in the neighborhood of the bottom of the respective intermediate container 5 and 6 outlet tubes 11 and 12 are arranged which lead up to a common outlet tube 13 which is connected to a spraying station (not shown). In the respective outlet tube 11 and 12 valves 14 and 15 are arranged. In the respective intermediate container 5 and 6 a level guard 16 and 17 is arranged. The level guard can consist of a type being adopted for each type of medium, whereby for example a guard of the tuning fork type can be suitable when highly viscous and/or colored media are concerned. The level guard 16 and 17 is adopted to control the respective pump 7 and 8 and the respective valve 14 and 15 via a controlling unit (not shown). Other types of level guards are capacitive transmitters and floating body controlled transmitters.

The device according to the present invention functions in accordance with the following description of the function:

At the starting up it is presumed that both transport containers 1 and 2 are present at their respective place and are filled with a suitable medium. The pump 7 is started whereby the intermediate container 5 is filled and return transport of the medium to the transport container 1 takes place. The valve 14 is opened and by pumping medium from the spraying station the tubes 11 and 13 are filled up. For the sake of simplicity it is hereby presumed that the tube 12 is filled and that the intermediate container 6 contains a medium up to the level guard 17. A continuous and/or discontinuous draft of medium through the tubes 11 and 13 takes place while the pump 7 transports medium continuously into and sends in return medium to and from the intermediate container 5, whereby the transport container 1 will be emptied little by little. When the transport container 1 has become emptied the intermediate container 5 will become filled up with air and the level of medium will sink down to the level guard 16 whereby this sends a signal to its controlling unit whereby the valve 15 opens and the valve 14 closes, and the pump 7 is switched off, and simultaneously herewith the pump 8 starts and transports medium into the intermediate container 6 from its transport container 2 via the tube 4 and sends medium in return via the tube 10, and medium can now be taken out via the tubes 12 and 13 to the spraying station. As the tubes are always filled with a medium any form of admission of air is avoided to the spraying station while in operation. When the transport container 1 has been emptied an alarm is provided and an exchange of container to a filled one takes place. When the container 2 then has been emptied an exchange in a corresponding way is made back to the transport container 1, the intermediate container 5 etc. without admission of air.

The pumping in return of the medium to the transport container has been provided to keep the intermediate containers 5 and 6 permanently filled as long as medium is at hand, and to lower the viscosity of the medium and thereby facilitate spraying but also the emptying of the transport containers. The transport containers may suitably be inclined to facilitate a maximum emptying thereof.

I claim:

1. A system for exchanging containers containing a medium while said system is in operation during spraying of said medium without admitting air, comprising: at least two intermediate containers, each of said at least two intermediate containers being connected to and receiving medium from a respective transport container, each of said at least two intermediate containers also being connected to its respective transport container by way of a return tube and a pump, each of the at least two intermediate containers also being connected to a common outlet tube by way of an interconnecting outlet tube and a valve, said common outlet tube being connected to a spraying station and each of said at least two intermediate containers including a device for determining the level of medium in the respective intermediate container.

2. The system according to claim 1, wherein said device for determining the level of medium in the respective intermediate container is a transmitter of the tuning fork type.

3. The system according to claim 1, wherein said device for determining the level of medium in the respective intermediate container is a capacitive transmitter.

4. The system according to claim 1, wherein said device for determining the level of medium in the respective intermediate container is a floating body controlled transmitter.

5. A system for permitting containers having less than a predetermined level of medium contained therein to be replaced with a container that is substantially full of medium during operation of the system and without admitting air, comprising: at least two intermediate containers, a transport container connected to each of said at least two intermediate containers by way of a feeding tube, said transport containers containing medium and each of said at least two intermediate containers receiving medium from its respective transport container through the feeding tube, means interconnecting each of said at least two intermediate containers with its respective transport container for returning medium in each of said at least two intermediate containers to its respective transport container, each of said at least two intermediate containers also being connected to a common outlet tube by way of an interconnecting outlet tube, each of said interconnecting outlet tubes having a valve positioned therein for alternately permitting and preventing the flow of medium from the respective intermediate container to the common outlet tube, each of said at least two intermediate containers including means for determining the level of medium in the respective intermediate container.

6. The system according to claim 5, wherein said means for returning medium in each of said at least two intermediate containers to its respective transport container includes a return tube connecting an interior of the intermediate container with an interior of its respective transport container and a pump for pumping medium from the intermediate container to its respective transport container.

7. The system according to claim 6, wherein each of said return tubes is connected to its respective intermediate container adjacent an upper end of the intermediate container and is connected to its respective transport container adjacent on upper end of the transport container.

8. The system according to claim 5, wherein each of said feeding tubes is connected to its respective intermediate container at a point closer to a bottom of the intermediate container than a top of the intermediate container.

* * * * *